US012691449B2

(12) United States Patent
Lee et al.

(10) Patent No.: US 12,691,449 B2
(45) Date of Patent: Jul. 28, 2026

(54) FREEZE-DRYING APPARATUS AND METHOD

(71) Applicant: FLUOROGENICS LIMITED, Eastleigh (GB)

(72) Inventors: Martin A. Lee, Salisbury (GB); Diane R. Lee, Salisbury (GB); Peter Lovell, Salisbury (GB)

(73) Assignee: New England Biolabs Lyophilization Sciences, Ltd., Hitchin (GB)

( * ) Notice: Subject to any disclaimer, the term of this patent is extended or adjusted under 35 U.S.C. 154(b) by 973 days.

(21) Appl. No.: 17/778,638

(22) PCT Filed: Nov. 26, 2020

(86) PCT No.: PCT/EP2020/083509

§ 371 (c)(1),
(2) Date: May 20, 2022

(87) PCT Pub. No.: WO2021/105284

PCT Pub. Date: Jun. 3, 2021

(65) Prior Publication Data

US 2022/0410148 A1 Dec. 29, 2022

(30) Foreign Application Priority Data

Nov. 27, 2019 (GB) ..................................... 1917281

(51) Int. Cl.
*A61B 50/10* (2016.01)
*A61B 50/13* (2016.01)
(Continued)

(52) U.S. Cl.
CPC ....... *B01L 3/50825* (2013.01); *B01L 3/50853* (2013.01); *B01L 3/50855* (2013.01);
(Continued)

(58) Field of Classification Search
CPC ........................... F26B 25/063; F26B 5/04–06
(Continued)

(56) References Cited

U.S. PATENT DOCUMENTS 5,732,837 A 3/1998 Jones
6,458,582 B1 10/2002 Kimura et al.
(Continued)

FOREIGN PATENT DOCUMENTS

CA 2410322 C * 7/2010 ............. B01D 61/30
CN 106573715 A * 4/2017 ........... B65D 75/367
(Continued)

OTHER PUBLICATIONS

English translation of JP2009241934 by PE2E, Apr. 4, 2025.*
(Continued)

*Primary Examiner* — Deming Wan

(57) ABSTRACT

A process for freeze drying a material. The process has the steps of (a) placing material to be freeze-dried in a vessel, the vessel comprising a container having a base, and at least one wall defining an opening at one end; (b) applying a membrane to the at least one wall to thereby cover the opening, wherein the membrane comprises an aperture which, in use, is aligned with the opening; and (c) subjecting the vessel to a lyophilisation procedure, wherein the membrane is in place on the container during the lyophilisation procedure.

33 Claims, 9 Drawing Sheets

(51) Int. Cl.

| | |
|---|---|
| ***B01L 3/00*** | (2006.01) |
| ***F26B 5/06*** | (2006.01) |
| ***F26B 21/00*** | (2026.01) |
| ***F26B 21/20*** | (2026.01) |
| ***F26B 21/50*** | (2026.01) |
| ***F26B 25/06*** | (2006.01) |
| ***F26B 25/08*** | (2006.01) |

(52) U.S. Cl.
CPC .............. *F26B 5/06* (2013.01); *F26B 25/063* (2013.01); *F26B 25/08* (2013.01); *B01L 2300/044* (2013.01); *B01L 2300/048* (2013.01); *B01L 2300/0829* (2013.01); *B01L 2300/0832* (2013.01); *B01L 2300/10* (2013.01)

(58) Field of Classification Search
USPC .................... 34/284–286; 215/307, 364, 261
See application file for complete search history.

(56) References Cited

U.S. PATENT DOCUMENTS

| | | | | |
|---|---|---|---|---|
| 11,340,014 | B2 * | 5/2022 | Trout | A61K 9/19 |
| 2004/0048392 | A1 * | 3/2004 | Kidd | B01L 3/50853<br>422/942 |
| 2014/0215845 | A1 * | 8/2014 | Corver | F26B 5/06<br>34/92 |
| 2015/0089830 | A1 * | 4/2015 | Wissner | B65B 7/2892<br>34/92 |

FOREIGN PATENT DOCUMENTS

| | | | | | |
|---|---|---|---|---|---|
| CN | 106643116 | A | | 5/2017 | |
| CN | 209004706 | U | | 6/2019 | |
| EP | 0380121 | B1 | * | 1/1990 | A61B 5/14 |
| FR | 2682088 | A1 | | 4/1993 | |
| JP | 2009189493 | A | | 8/2009 | |
| JP | 2009241934 | A | * | 10/2009 | A61J 3/00 |
| JP | 2010025370 | A | | 2/2010 | |
| WO | 200002795 | A1 | | 1/2000 | |
| WO | 2013014413 | A1 | | 1/2013 | |

OTHER PUBLICATIONS

English translation of EP-0380121 by PE2E Apr. 4, 2025.*
Englsih translation of CA2410322 by PE2E Apr. 4, 2025.*
English translation of CN 106573715 by PE2E Sep. 13, 2025.*

* cited by examiner

A-A

B-B

A-A

B-B

FREEZE-DRYING APPARATUS AND METHOD

CROSS REFERENCE

This application is a § 371 application of International Application No. PCT/EP2020/083509, filed Nov. 26, 2020, which claims the benefit of GB Application 1917281.6, filed on Nov. 27, 2019. The entire contents of these applications are incorporated herein by reference in their entirety.

TECHNICAL FIELD

The present invention relates to vessels for use in chemical and biochemical reactions and procedures, in particular freeze-drying or lyophilisation procedures, as well as related systems, methods for preparing these vessels and their use.

BACKGROUND

There is a requirement to facilitate continuous improvement in human health through the provision of rapid, molecular based testing of samples for diagnostic purposes. Although traditionally diagnostic tests have been carried out in a laboratory environment, there is an increasing trend towards "point-of need" diagnostic tests that can provide rapid results, whilst the patient waits, for example in the clinic. These methods currently utilise dedicated integrated instruments which are specifically designed for the purpose, including conducting reactions such as nucleic acid amplifications like the polymerase chain reaction (PCR). However, many existing laboratory-based platforms and apparatuses could be utilised in this way if their operation could be simplified for the end user, who may not have the high levels of skill found in personnel working in a conventional diagnostic laboratory.

The adaptation of such equipment however faces a number of challenges. At present, the formulations required for use in the analysis are complex to assemble and require multiple stock reagents. Many are unstable and are required to be kept under cold conditions, meaning that refrigeration plant is required. These problems may be addressed by lyophilisation or freeze-drying of reagents.

It is important that freeze-dried products are protected from oxygen and moisture, as exposure to these will reduce the life of the product.

Generally, the vessels used for freeze-drying procedures are moulded glass vials. These are typically provided with a vented neoprene or rubber bung which is generally impervious to both oxygen and moisture. The vented bung is located loosely over the glass vial, enabling venting during freeze drying. After freeze-drying the vial is typically back filled with an inert gas. Once the freeze-drying procedure is complete, the bung/stopper is pushed into the vial via a descending shelves system. Glass vials sealed with a neoprene or rubber bungs are generally impervious to both oxygen and moisture. Freeze dried PCR and RT-PCR products produced in this way can have up to 5 years stability. However, such vials are not generally useful for the subsequent analysis for various reasons. Glass is generally not biocompatible with enzymes and nucleic acids that are the subject of biochemical analysis. It is therefore necessary to use blocking or other reagents to address biocompatibility issues, leading to further complication of the formulation and possible regulatory issues.

It is desirable to store freeze-dried products in plastic vessels. Many biochemical or chemical reactions, such as nucleic acid amplification for example polymerase chain reactions (PCR) are carried out in plastic vessels. Typical plastics vessels include plastics PCR tubes, wells, strips and plates. Plastics vessels have the advantage of biocompatibility with reagents used in biochemical or chemical reactions. However, plastics vessels have the disadvantage that plastics allows some diffusion of oxygen and moisture. In most cases PCR tube primary packaging (such as plastic PCR tubes) offers no protection to products. PCR tubes typically have a wall thickness of 0.2-0.4 mm. Plastics vessel with walls this thin offer very little if any long-term protection. Instead they offer only a way of containing the "cake" and are the test-tube for the PCR itself in the end application. Whilst glass vessel can have their bungs applied in the freeze-drying apparatus via a descending shelves apparatus, there are no solutions for sealing plastic vessels in the freeze-drying apparatus, particularly for PCR tubes, which are very small. It is difficult to design an automated closure system which can accommodate the tolerances required for such small vessels.

For small plastics vessels, the freeze-drying procedure is typically carried out without a closure. After the freeze-drying procedure, the plastics vessel is typically back-filled with an inert gas whilst in the freeze-drying apparatus and transferred, without a closure, from the freeze-drying apparatus to a humidity controlled dry cabinet. Once in the dry cabinet, the closures are applied.

The transition between freeze-drying apparatus and dry cabinet is a factor which may significantly reduce product life. Even though the vessel is filled with inert gas, the freeze-dried material is exposed to atmospheric moisture and oxygen during this transition.

A further difficulty is the application of the closures to the vessel in the dry cabinet. The dry cabinet is typically a glove box, and the closures must be applied whilst wearing gloves and in a confined space, causing issues with lack of dexterity.

The closures used for plastic vessels can be seals or lids. Adhesive seals have the disadvantage that it is difficult to part the seal from its backing, particularly in the glove box as the user will be wearing thick gloves. Furthermore, there can be issues caused by "static", causing the freeze-dried material to stick to the adhesive seal, thus causing loss of freeze-dried material from the vessels.

Alternatively, heat seals may be used. Heat seals have the disadvantage that use of heat-sealing apparatus inside the confined space of the dry cabinet increases the temperature inside the dry cabinet. Heat build-up within the dry cabinet can be significant on large packaging runs; this reduces the product life of the freeze-dried material, for example through relaxing of the glass structure or heat-inactivating some enzymes.

Alternatively, lids may be used. Lids are applied manually by pushing them into the vessel. However, this requires dexterity on small vessels in a confined glove box dry cabinet. In addition, most PCR tubes are designed to retain a lid though an interference fit in order to create a seal. Removal and replacement of lids can cause contamination issues in the final application, for example PCR contamination can occur through lid leakage.

Lyophilised PCR reagents benefit from centrifugation prior to drying; this removes bubbles (degassing) that prevents undesirable cake features. It also ensures the full volume is in the bottom of the tube for simple dissolution by the end user. However, centrifugation of unsealed tubes can be difficult. For some types of centrifuge, such as a benchtop plate spinner centrifuge, a temporary seal is required for the centrifuge process. Whilst centrifugation can be done on unsealed tubes, for example using a swinging bucket centrifuge, this is typically very time consuming and labour intensive. This is a disadvantage when the time from formulation to dispensing and drying is critical for many amplification reagents.

Conventionally, vessels containing freeze-dried products are packaged with a desiccant into pouches made from metallized boPET (biaxially-oriented polyethylene terephthalate) film, such as Mylar™. The sealed pouches are stored in either a humidity-controlled environment or a dry cabinet, which is both humidity controlled and contains a nitrogen atmosphere.

It is an object of the invention to overcome the disadvantages of the prior art.

SUMMARY OF THE INVENTION

An aspect of the present invention provides a process for freeze drying a material, said process comprising the steps of:

(a) placing material to be freeze-dried in a vessel, the vessel comprising a container having a base, and at least one wall defining an opening at one end;

(b) applying a membrane to the at least one wall to thereby cover the opening, wherein the membrane comprises an aperture which, in use, is aligned with the opening; and (c) subjecting the vessel to a lyophilisation procedure.

The container may be made of plastics. The membrane may comprise a metal foil. The membrane may comprise a composite membrane, for example comprising at least one layer of metal material and at least one layer of non-metal material, such as a plastics material. A composite foil has the advantage that it can be configured to prevent contact between a reagent in the vessel and metal in the membrane. For example, the composite membrane may be configured so that a plastics material is on an outer layer of the membrane. In this case, the outer layer forms a barrier between the metal layer of the membrane and the contents of the vessel. Furthermore, the plastics material may form a "weld" with the at least one wall of the vessel.

In one embodiment, the metal may comprise aluminium. Alternatively, the membrane may comprise a plastics film. The plastics film may comprise a clear plastics material, for example a polymer.

The size of aperture must be large enough to allow mass transfer of moisture during drying but also small enough to retain the material within the vessel. The aperture may have an area of from about 0.2 $mm^2$ to about 13 $mm^2$. The aperture may have an area of less than or equal to about 13 $mm^2$, about 10 $mm^2$, about 6 $mm^2$ or about 3 $mm^2$. The aperture may have an area of greater than or equal to about 2 $mm^2$, about 3 $mm^2$, about 6 $mm^2$ or about 10 $mm^2$. Optionally the area of the aperture may be in the range of from about 2 $mm^2$ to about 3 $mm^2$, or from about 2 $mm^2$ to about 6 $mm^2$, or from about 2 $mm^2$ to about 10 $mm^2$, or from about 2 $mm^2$ to about 13 $mm^2$, or from about 3 $mm^2$ to about 6 $mm^2$, or from about 3 $mm^2$ to about 10 $mm^2$, or from about 3 $mm^2$ to about 13 $mm^2$, or from about 6 $mm^2$ to about 10 $mm^2$ or from about 6 $mm^2$ to about 13 $mm^2$, or from about 10 $mm^2$ to about 13 $mm^2$.

In one embodiment, the aperture is circular. However, the aperture may be other shapes, for example it may comprise a rectangular (including square and oblong), triangular or star shape. In one embodiment, the aperture is circular or substantially circular and has a diameter within the range of about 0.5 mm to about 4 mm. The aperture may be circular and have a diameter of equal or less than about 4 mm, about 3 mm, about 2 mm, or about 1 mm. The aperture may be circular and have a diameter of equal or greater than about 0.5 mm, about 1 mm, about 2 mm or about 3 mm. Optionally the diameter of the aperture may be in the range of from about 0.5 mm to about 1 mm, or from about 0.5 mm to about 2 mm, or from about 0.5 mm to about 3 mm, or from about 1 mm to about 2 mm, or from about 1 mm to about 3 mm, or from about 1 mm to about 4 mm or from about 2 mm to about 3 mm, or from about 2 mm to about 4 mm, or from about 3 mm to about 4 mm.

In another embodiment, the aperture is a non-circular shape, for example but not limited to, a rectangular shape. The maximum distance across the non-circular shape may be within the range of about 0.5 mm to about 4 mm. The aperture may be non-circular and have a maximum distance of equal or less than about 4 mm, about 3 mm, about 2 mm, or about 1 mm. The aperture may be non-circular and have a maximum distance of equal or greater than about 0.5 mm or about 1 mm or about 2 mm or about 3 mm. Optionally the maximum distance of the aperture may be in the range of from about 0.5 mm to about 1 mm, or from about 0.5 mm to about 2 mm, or from about 0.5 mm to about 3 mm, or from about 1 mm to about 2 mm, or from about 1 mm to about 3 mm, or from about 1 mm to about 4 mm or from about 2 mm to about 3 mm, or from about 2 mm to about 4 mm, or from about 3 mm to about 4 mm.

The step of applying the membrane to the at least one wall of the container may comprise sealing the membrane to the at least one wall of the container. In one embodiment, sealing comprises heat-sealing. Alternative sealing methods may be used, such as adhesive sealing. The membrane may be reversibly sealed to the at least one wall of the container. This allows the membrane to be easily removed from the container before use. For composite membranes comprising at least one layer of plastics material and at least one metal layer, the step of sealing the composite membrane to the at least one wall of the container may comprise "welding" the plastics material of the composite membrane to the at least one wall of the container. In one embodiment sealed in this manner, the membrane may be removed leaving the plastics layer in place. In another embodiment, the membrane comprises a polymer membrane which is permanently sealed to the at least one wall of the container.

Following the lyophilisation procedure, gas may be introduced into the vessel. Many inert gases are suitable, for example nitrogen gas, argon gas and dried air.

The step of subjecting the vessel to a lyophilisation procedure may take place in a freeze-drying apparatus. Following the lyophilisation procedure, the freeze-drying apparatus may be filled with an inert gas, to thereby introduce the inert gas into the vessel by diffusion through the aperture.

After the lyophilisation procedure, the vessel may be transferred to a dry cabinet. The dry cabinet may have a moisture level of less than 5% V/V. Typically the relative humidity<20% at 20° C. In a preferred embodiment, the moisture level is 1-2% V/V.

Following the lyophilisation procedure, the vessel may be placed in a non-porous receptacle. The non-porous receptacle may also contain a desiccant. The non-porous receptacle containing the vessel and desiccant may be sealed, for example heat sealed. The non-porous receptacle may act as a vapour storage container and moisture barrier, for example a can or bag. The non-porous receptacle may comprise a metallised polymer that has a vapour transmission rate lower than the native polymer. In one embodiment, the metallised polymer comprises a metallized boPET (biaxially-oriented polyethylene terephthalate) film, such as Mylar™.

The material may comprise one or more components that are required for carrying out a chemical or biochemical reaction. The chemical or biochemical reaction may be a nucleic acid amplification reaction. The nucleic acid amplification reaction may be a polymerase chain reaction, or reverse-transcriptase polymerase chain reaction. The chemical or biochemical reaction may comprise a restriction endonuclease or ligase reaction, such as whole genome amplification and isothermal amplification. The material may comprise a biochemical species that may be stabilised in a lyophilise product. The chemical or biochemical reaction may be subsequently carried out in the vessel. The reaction may be carried out using an automated apparatus.

An aspect of the present invention provides a vessel for use in a freeze-drying procedure, the vessel comprising a container having a base, and at least one wall defining an opening at one end;

a membrane configured to cover the opening of the container, wherein the membrane is provided with an aperture which, in use, is aligned with the opening of the container.

In particular, the vessel may comprise a generally cylindrical section which is open at a first end and closed by means of a base at the other end. Suitably the internal surface of the base is generally conical so that contents gather in the lower apex, allowing efficient removal of solutions, even of low volumes, using conventional aspiration means such as pipettes and syringes, in particular during automated processes. The concentration of the contents of the vessel within the small volume apex of the cone may assist with vapour release during the sublimation part of the freeze-drying process by having the highest proportion (by mass) near the surface of the sample to be dried.

The volume of the vessel will suitably be similar to that required for use in chemical and biochemical reactions carried out in the life sciences field, and in particular will be in the range of from 100 to 2000 μl.

In this respect, the vessel may resemble in form the well-known "Eppendorf™" and "MicroAmp™" tubes that are in widespread use in the life sciences arena. Such tubes can be produced in a standard size and would be readily located for use or storage in the racks and storage products already in use in the automated apparatus and equipment in use life sciences industry.

In addition to individual tubes, vessels may be in the form of a vessel having multiple containers, which are suitably arranged in an array. A particular example of such a vessel are multi-well plates such as microtitre plates that conventionally contain 96 individual wells.

The opening may span more than one vessel, for example, the opening may comprise a slit extending across several vessels.

Vessels as described above can be prepared by any conventional method such as injection moulding, vacuum forming, or machining, depending upon the particular nature of the plastic used. They are suitably disposable or consumable and so may be for a "single-use" apparatus.

The membrane may comprise a metal foil, for example an aluminium foil. Alternatively, the membrane may be made from other materials, such as a plastics film. The membrane may comprise a composite membrane, comprising a layer of plastics material and a layer of metal.

The aperture may have an area of from about 2 $mm^2$ to about 13 $mm^2$. The aperture may have an area of less than or equal to about 13 $mm^2$, about 10 $mm^2$, about 6 $mm^2$ or about 3 $mm^2$. The aperture may have an area of greater than or equal to about 2 $mm^2$, about 3 $mm^2$, about 6 $mm^2$ or about 10 $mm^2$.

The membrane may be removably attachable to the container. In one embodiment, the membrane is removably attachable to at least one wall surrounding the opening. The membrane comprises may be attached to the container by a heat seal. Alternatively, the membrane may be attached to the container by other means, for example by adhesive.

The vessel may comprise multiple containers, each of which may be provided with a membrane or a portion of a membrane. The multiple containers may be joined together to form a single unit. Individual or groups of multiple containers may comprise separate units. For example, a single unit of multiple containers may comprise a multi-well plate, such as a microtitre plate. Examples of individual containers include a tube, vial or well; groups of multiple containers may comprise strips or blocks of tubes, vials or wells for a multiwell plate. The containers may be arranged in an array.

The vessel comprises may comprise a microtitre plate and each container may comprise a well in a microtitre plate.

A single membrane may be provided for the multiple containers, arranged such that a portion of the membrane covers an opening of each container in the vessel, and each portion of membrane is provided with an aperture. In one embodiment, a boundary between two adjacent portions of membranes is provided with an area of weakness to facilitate separating the portions of membranes.

The multiple containers may comprise separate individual or groups of containers and wherein the boundary between two adjacent portions of membranes may be aligned with a boundary between adjacent separate individual or groups of containers.

The membrane may comprise at least one alignment feature to aid alignment in analytical apparatus. The vessel may comprise multiple containers and multiple portions of membrane, each portion being aligned with a container, wherein each portion comprises a separate alignment feature.

The vessel may comprise material which has been freeze-dried in situ in the container. The vessel may comprise an inert gas in the container. Said material may comprise reagents useful in a nucleic acid amplification reaction. The nucleic acid amplification reaction may be a polymerase chain reaction.

An aspect of the invention provides a system for use in a freeze-drying procedure, the system comprising:

two or more vessels, each vessel comprising:

one or more container, each container having at least one wall defining an opening at one end; and a membrane, divided into membrane portions, each membrane portion being configured to cover the opening of a container, wherein each membrane portion is provided with an aperture which, in use, is aligned with the opening of the container; and a support for receiving the two or more vessels and being configured to retain the two more vessels in alignment with one another, the support having at least one alignment feature configured to engage with a corresponding alignment feature of the membrane to thereby align the membrane relative to the two or more vessels.

The alignment feature of the support may comprise one or more male member and the corresponding alignment feature of the membrane comprises one or more female member.

The one or more male member may comprise one or more pin and the one or more female member may comprise one or more hole.

The one or more container may comprise a well for a multi-well plate. The one or more container may comprise a strip of wells or a block of wells.

An aspect of the invention provides the use of a vessel comprising a container having an open end and a membrane configured to cover the open end of the container, wherein the membrane is provided with an aperture which, in use, is aligned with the open end of the container, in a freeze-drying procedure.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which:

A vessel 10 for freeze drying a material is illustrated in FIG. 1. The vessel 10 has a container 12 which has a base at its lower end 22 and an opening 24 at an upper end. In this embodiment, the container is a PCR tube of the type referred to as an "Eppendorff™" or tube and has an upper cylindrical body section and a lower conical body section. The tube is made of plastics material, in this embodiment polypropylene. The tube typically has a volume of approximately 0.5 ml The opening 24 is covered by membrane 14, in the form of a metal foil. In this embodiment, the membrane is aluminium foil. The membrane is secured to the walls of the upper cylindrical body section surrounding the opening 22 by a heat seal. The membrane 14 is provided with an aperture 16, having a diameter of approximately 1 mm. FIG. 2 is a plan view of the membrane 14 of the vessel of FIG. 1, showing the aperture 16.

FIG. 3 is a flow diagram showing the main steps of the freeze-drying method. Firstly, the material 18 to be freeze-dried is dispensed into the container 26. The material 18 typically comprises reagents required to carry out a polymerase chain reaction on a particular target nucleic acid. The reagents may typically comprise primers, enzymes, salts and probes.

The membrane is then applied to cover the opening of the container 28. The membrane is fixed in place by heat sealing. The membrane is applied after dispensing and prior to centrifugation, freeze-drying and transfer to a dry cabinet.

The vessel may be subjected to an optional centrifugation step 30, followed by a lyophilisation procedure 32, which takes place in a freeze-drying apparatus. The lyophilisation procedure is well known and will not be described in detail.

Figure 1:
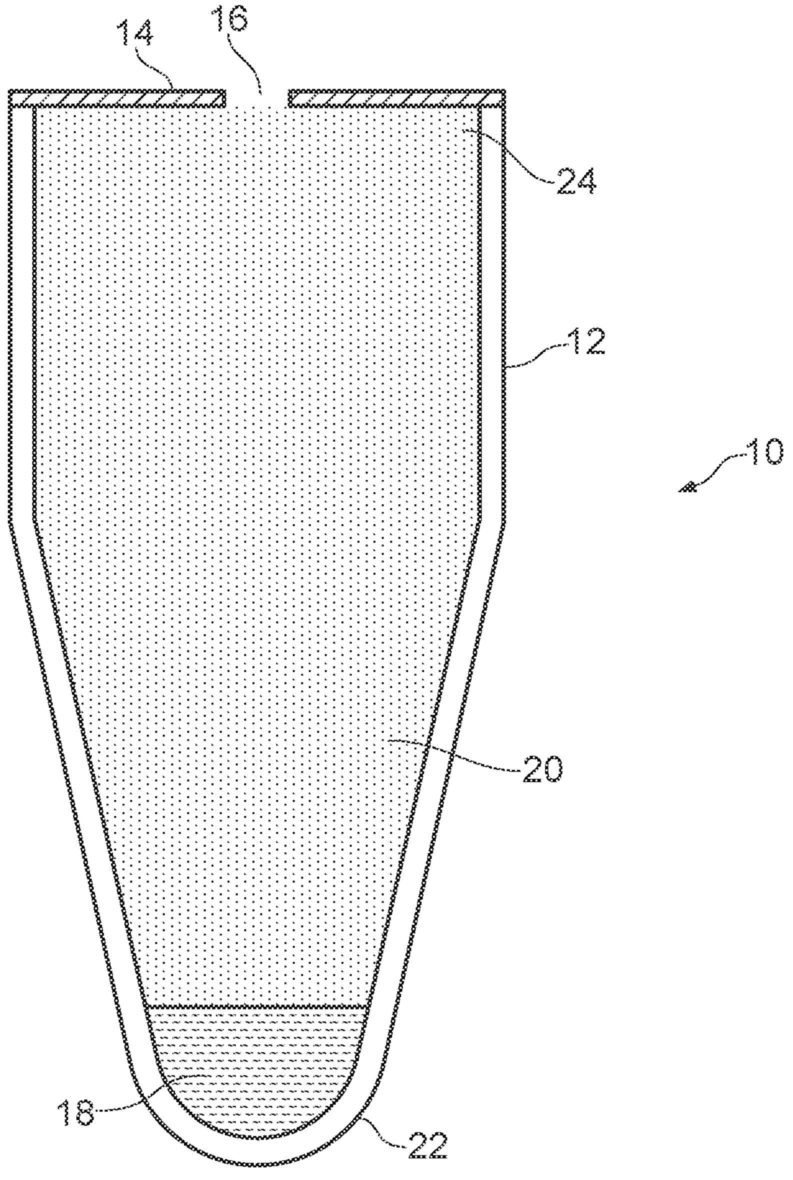
FIG. 1 is cross section of a freeze-drying vessel.
Figure 2:
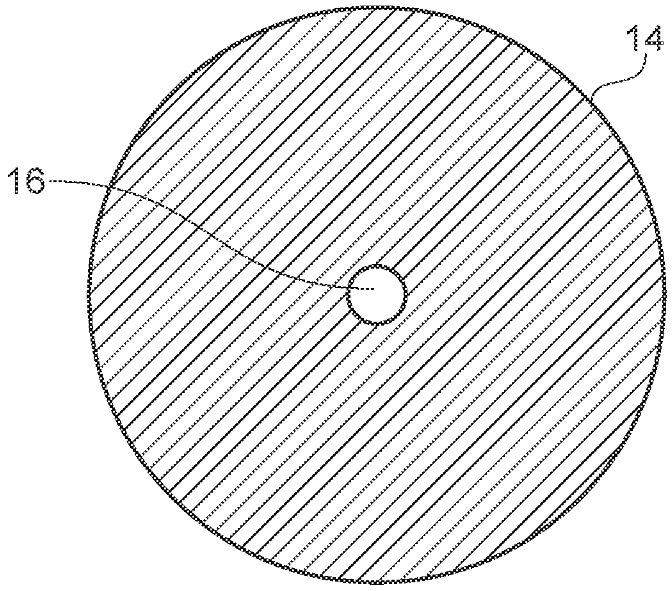
FIG. 2 is a plan view of a membrane of the freeze-drying vessel according to FIG. 1.
Figure 3:
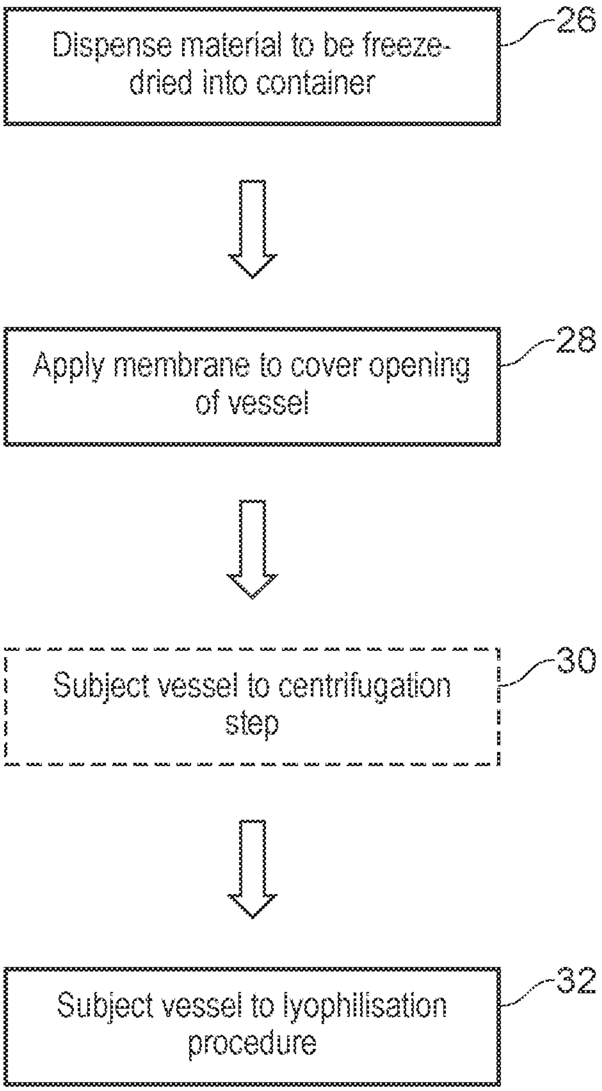
FIG. 3 is a flow diagram illustrating a freeze-drying process.
Figure 4:
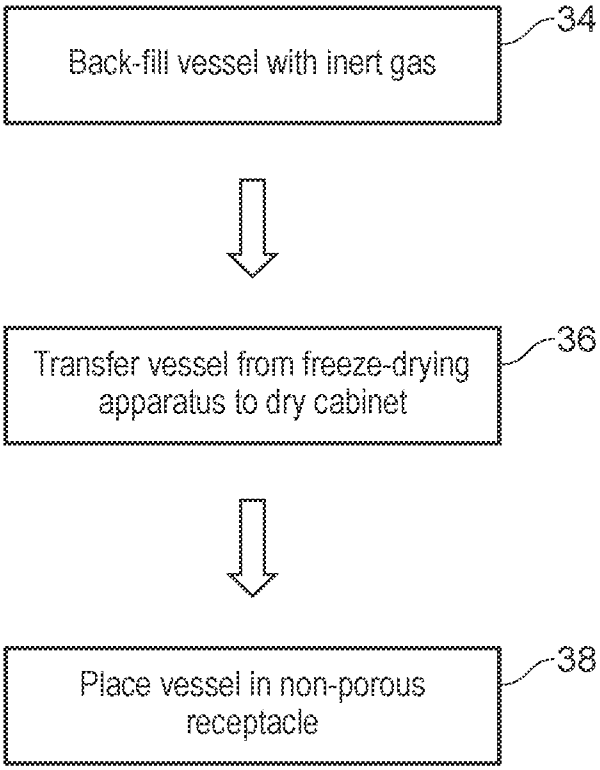
FIG. 4 is a flow diagram illustrating the process following freeze-drying.

The procedure following lyophilisation is shown in FIG. 4. Once the lyophilisation process is complete, the vacuum inside the freeze-drying apparatus is broken with an inert gas, thereby back-filling the vessel with the inert gas 34. In this embodiment, the inert gas is nitrogen.

In step 36, the vessel is transferred from the freeze-drying apparatus to a dry cabinet. The dry cabinet is filled with nitrogen gas and has moisture level of 1-2% V/V.

As discussed above, the membrane is applied to the container before both centrifugation and the lyophilisation procedure takes place. The aperture in the membrane is sufficiently sized to retain the liquid effectively prior to drying (for example in the centrifugation step) and to allow sufficient venting for the cakes to dry during the lyophilisation process. The aperture also allows back-filling of the vessel with nitrogen and allows a "blanket" of dry nitrogen to be retained within the vessel. Furthermore, it mechanically retains the freeze-dried cake. These last two advantages are particularly important during the transfer of the vessel from freeze-drying apparatus to dry cabinet. The aperture is sufficiently small that very little nitrogen is lost from the vessel during this short transition, protecting the freeze-dried material from the humidity and oxygen in the air. No additional closure is required to cover the opening of the container during this transfer.

Once the vessel is in the dry cabinet, it is placed into a non-porous receptacle 38, along with a desiccant and the receptacle is sealed (for example heat-sealed). The non-porous receptacle is typically made from metallized boPET, such as a Mylar™ bag. No additional closure is required, so the fiddly procedure of applying closures in the dry cabinet is eliminated. If a zip-lock bag is used, a heat seal may be preferably made post packing outside the cabinet to eliminate all other processes from the cabinet.

As humidity and oxygen is kept out of the vessel during the transfer from freeze-drying apparatus to dry cabinet, the vessel can be stored in the non-porous receptacle without the need for an additional cap, which simplifies the procedure.

Figure 5:
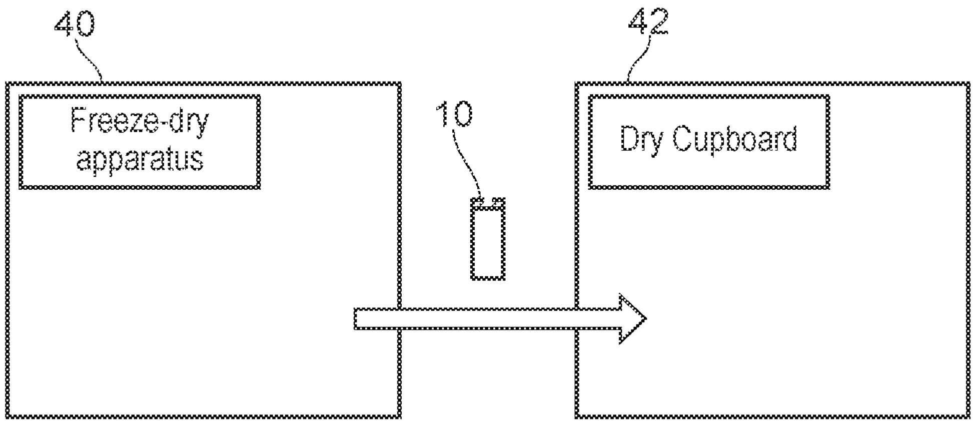
FIG. 5 is a schematic illustration showing transfer of the vessel from freeze-drying apparatus to dry cupboard.

FIG. 5 shows the transfer of the vessel 10 from the freeze-drying apparatus 40, where freeze-drying and back-filling with nitrogen gas take place, to the dry cabinet 42 where the final stages of packaging take place. The membrane is applied to the container prior to placing it in the freeze-dryings apparatus and remains in place in the freeze-drying apparatus, during the transfer, and in the dry cabinet, without any further closure being required.

The freeze-dried material packaged in this way can be stored for between 1.5 to 5 years, depending on the reagent formulation.

The freeze-dried material can be rehydrated, for example by introduction of a liquid sample that contains, or is suspected of containing, the target nucleic acid. This may be done by removing or piercing the membrane, for example with a pipette containing the liquid sample. It is advantageous if the membrane is removably attachable to the container, allowing it to be peeled off prior to use. The vessel may then be subject to conditions under which the polymerase chain reaction occurs, in particular thermal cycling conditions. Alternatively, the resulting reaction may contain multiple reactions that may be dispensed into other vessels after dissolution either prior to, or after the formation of a complete reaction through the addition of other reagents and/or template.

In one embodiment, multiple vessels are clustered together for the freeze-drying procedure but separated for storage. This is achieved by multiple containers held together in a support or "mandrel". For example, the containers may comprise individual wells, tubes or vials; strips (for example strips of 8 or 12 wells, tubes or vials); or blocks (i.e. multiple strips) which are mounted in a multiwell plate which is in turn mounted in the mandrel. A one-piece membrane is applied to the top of the multiple containers and heat sealed in place.

Figure 6B:
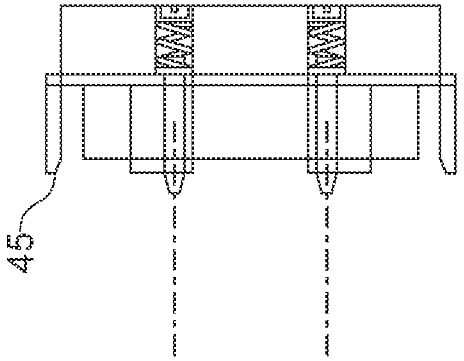
FIGS. 6A-6C are plan and cross-sectional views of a mandrel.
Figure 6A:
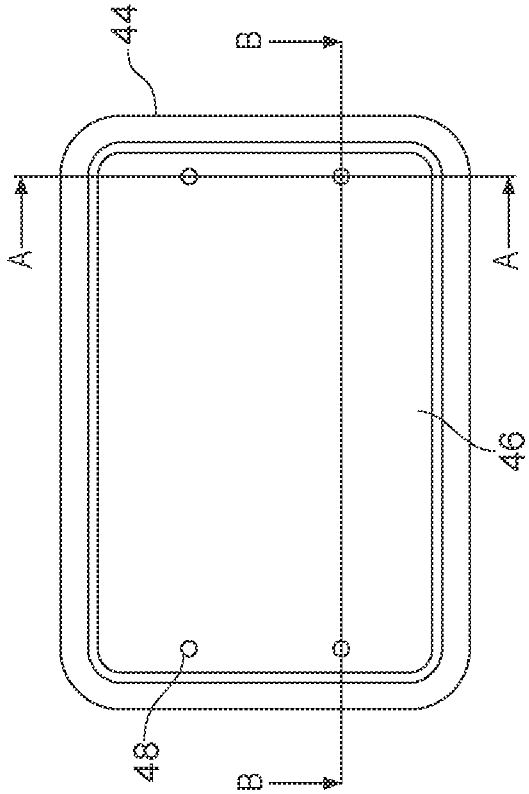
Figure 6C:
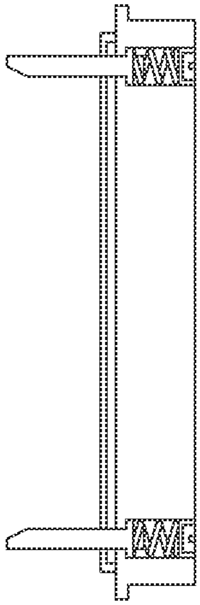

FIG. 6A-6C show the mandrel used to support the cluster of multiple vessels. FIG. 6A is a plan view, FIG. 6B is a cross section along AA and FIG. 6C is a cross section along BB. The mandrel 44 has a supporting surface 46 for receiving a multiwell plate and a peripheral rim 45 for engagement with the plate. Four location pins 48 locate both the multiwell plate and membrane in the desired position.

Figure 7:
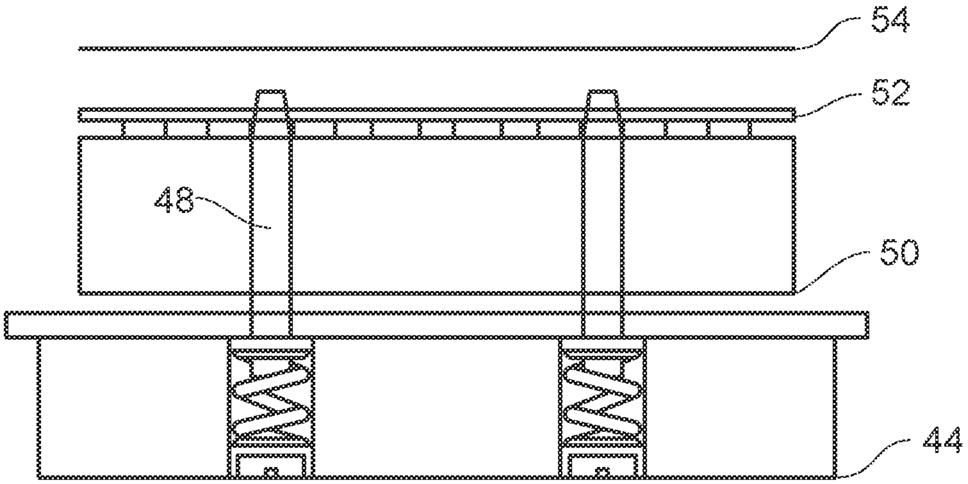
FIG. 7 is an exploded side view showing a mandrel, plate, vials and foil.

FIG. 7 shows an exploded side view of the mandrel 44, showing the multiwell plate 50 which is held in position by pins 48 cooperating with apertures (not shown) on the plate 50. Vials 52 are supported in the multiwell plate 50. Finally, FIG. 7 shows a membrane 54, in the form of a metal foil. This is provided with four apertures for cooperation with location pins 48 to ensure precise location of the membrane.

Figure 8A:
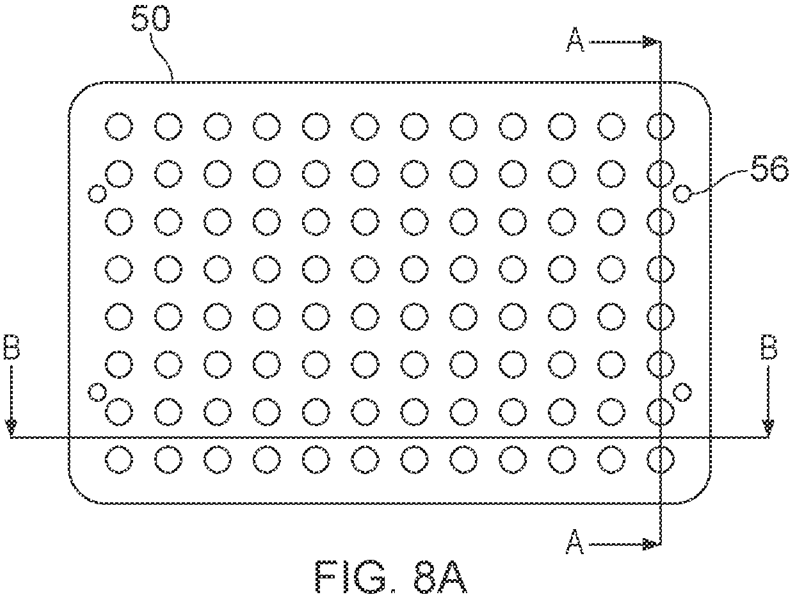
FIGS. 8A-8C are plan and cross-sectional views of a plate.
Figure 8B:
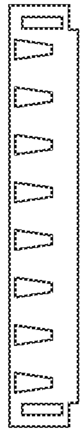
Figure 8C:

FIG. 8A-C illustrate the multiwell plate for use with the mandrel of FIG. 6A-C. the multiwell plate 50 is provided with four apertures 56 to cooperate with mandrel pins 46. The multiwell plate 50 is also provided with a peripheral flange 58, which, in use, hooks over rim 45 of the mandrel.

Figure 9:
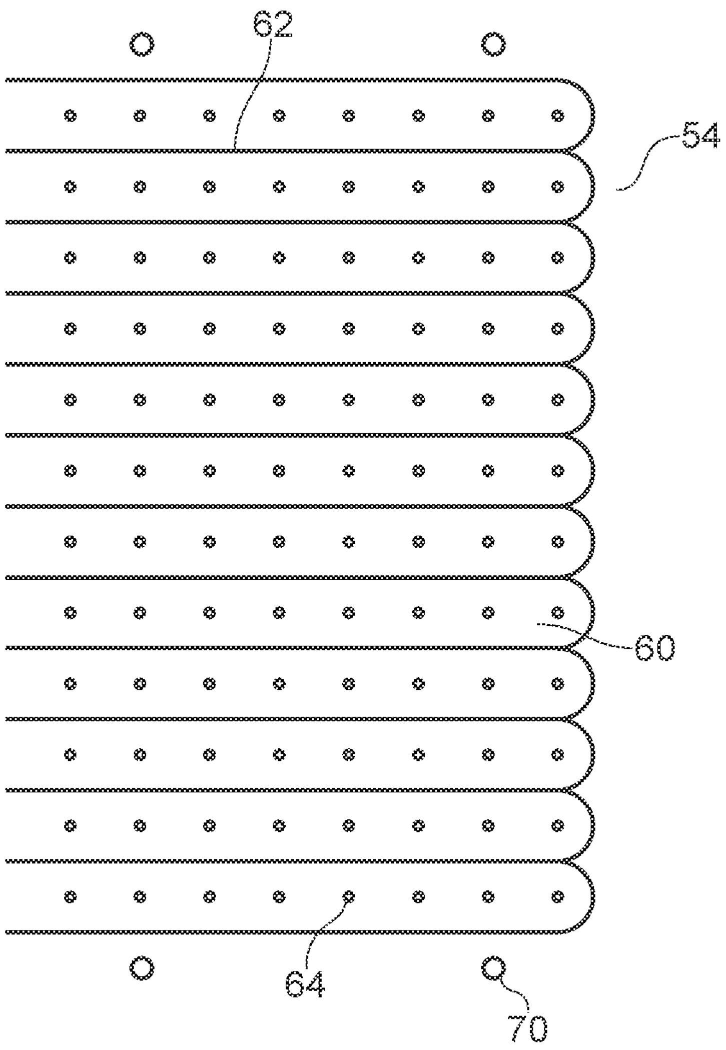
FIG. 9 is a plan view of a membrane.

FIG. 9 shows a plan view of the membrane 54. In this embodiment, the membrane is an aluminium foil and is provided with four alignment apertures 70, which cooperate with the alignment pins of the mandrel. The membrane has multiple apertures 64 which, when aligned by the mandrel, line up with the individual vials. The membrane has lines of weakness 62, which will allow the membrane to be broken apart in line with the containers. In the embodiment illustrated in FIG. 9, the lines of weakness are provided by perforations.

The membrane is labelled, for example via printing, text or bar codes to identify wells and their contents. Each portion may be labelled, so that the label remains when the individual containers are separated.

The membrane may be provided with foil features to assist with orientation of individual wells, strips and blocks in subsequent analysers. Foil features include chamfers or other cut features that allows visual or mechanical orientation.

Once the membrane has been sealed in place, for example by heat-sealing, the combined plate, containers and membrane are removed from the mandrel and undergo the freeze-drying process as described above.

Once the freeze-drying process is complete, the individual wells, strips or blocks are separated, making use of the lines of weakness in the membrane. They are then stored as required in Mylar™ packaging.

The vessel and method of use has several advantages. Once the membrane is applied to the container, it stays in place for centrifugation, freeze-drying, back-filling with inert gas, transfer and final packaging, with no extra closure being required. The process removes the time-consuming and fiddly operations in the dry cabinet by removing the need to add closures post processing. Furthermore, the end product has improved stability as it has reduced exposure to humidity and oxygen. The process of the present invention simplifies workflows, human time, and cabinet time. Furthermore, the end user experience during subsequent PCR analysis is improved, as this this entails the simple removal of the membrane from the container, addition of liquids and lids before amplification.

The invention claimed is:

1. A process for freeze drying a material, said process comprising:

(a) placing the material in a vessel, the vessel comprising a container having a base, and at least one wall defining an opening at one end;

(b) applying a membrane to the at least one wall to thereby cover the opening, wherein the membrane comprises an aperture which, in use, is aligned with the opening and wherein the membrane comprises a metal foil; and (c) subjecting the vessel to a lyophilization procedure, wherein the membrane is in place on the container during the lyophilization procedure.

2. A process according to claim 1, wherein the aperture has an area of from about 2 $mm^2$ to about 13 $mm^2$.

3. A process according to claim 1, wherein the step of applying the membrane to the at least one wall of the container comprises sealing the membrane to the at least one wall of the container.

4. A process according to claim 3, wherein sealing the membrane to the at least one wall of the container is selected from heat-sealing and adhesive sealing.

5. A process according to claim 3, wherein the membrane is reversibly sealed to the at least one wall of the container.

6. A process according to claim 1, comprising subjecting the vessel to a centrifugation process after step (b), wherein the membrane is in place on the container during the centrifugation process.

7. A process according to claim 1, further comprising (d) introducing inert gas into the vessel after the lyophilisation procedure, wherein the membrane is in place on the container during the introduction of the inert gas into the vessel.

8. A process according to claim 7, wherein the inert gas is selected from nitrogen gas, argon gas and dried air.

9. A process according to claim 7, wherein subjecting the vessel to a lyophilisation procedure further comprises subjecting the vessel to a lyophilisation procedure in a freeze-drying apparatus, and wherein the process further comprises (e) transferring the vessel containing the freeze-dried material and the inert gas from the freeze-drying apparatus to a dry cabinet, wherein the membrane is in place on the container during the transfer.

10. A process according to claim 9, wherein no additional closure covers the opening of the container during the (e) transferring.

11. A process according to claim 9, further comprising (f) in the dry cabinet, packaging the vessel into a non-porous receptacle with a desiccant and sealing the receptacle.

12. A process according to claim 11, wherein no additional closure covers the opening of the container when the vessel is packaged in the non-porous receptacle.

13. A process according to claim 11, wherein the non-porous receptacle comprises a metallized polymer that has a vapour transmission rate lower than the native polymer.

14. A process according to claim 1, wherein the material comprises one or more components that are required for carrying out a chemical or biochemical reaction.

15. A process according to claim 14, wherein the chemical or biochemical reaction is a nucleic acid amplification reaction.

16. A process according to claim 15, wherein the nucleic acid amplification reaction is a polymerase chain reaction or reverse-transcriptase polymerase chain reaction.

17. A vessel for use in a freeze-drying procedure, the vessel comprising a container having a base, and at least one wall defining an opening at one end; and a membrane configured to cover the opening of the container, wherein the membrane is provided with an aperture which, in use, is aligned with the opening of the container, wherein the membrane comprises a metal foil.

18. A vessel according to claim 17, wherein the aperture has an area of from about 2 $mm^2$ to about 13 $mm^2$.

19. A vessel according to claim 17, wherein the membrane is removably attachable to the container.

20. A vessel according to claim 19, wherein the membrane is attached to the container by a heat seal or by adhesive.

21. A vessel according to claim 17, comprising multiple containers, each of which is provided with a membrane or a portion of a membrane.

22. A vessel according to claim 21, wherein the multiple containers are joined together to form a single unit.

23. A vessel according to claim 22, wherein the multiple containers comprise individual or groups of multiple containers in separate units.

24. A vessel according to claim 17, wherein the membrane comprises at least one alignment feature to aid alignment in an analytical apparatus during a subsequent analysis procedure.

25. A vessel according to claim 24, comprising multiple containers and a single membrane, arranged such that a portion of the membrane covers an opening of each container in the vessel, and each portion of membrane is provided with an aperture, wherein each portion comprises a separate alignment feature.

26. A vessel according to claim 17, comprising a material which has been freeze-dried in situ in the container.

27. A vessel according to claim 26, comprising an inert gas in the container.

28. A vessel according to claim 26, wherein the material comprises reagents useful in a nucleic acid amplification reaction.

29. A vessel for use in a freeze-drying procedure, the vessel comprising:

a container having a base, and at least one wall defining an opening at one end; and a membrane configured to cover the opening of the container, wherein the membrane is provided with an aperture which, in use, is aligned with the opening of the container, wherein a single membrane is provided for the multiple containers, arranged such that a portion of the membrane covers an opening of each container in the vessel, and each portion of the membrane is provided with an aperture and wherein the membrane comprises a metal foil.

30. A vessel according to claim 29, wherein a boundary between two adjacent portions of membrane is provided with an area of weakness to facilitate separating the portions of membrane.

31. A vessel according to claim 30, wherein the multiple containers comprise separate individual or groups of containers and wherein the boundary between two adjacent portions of membranes may be aligned with a boundary between adjacent separate individual or groups of containers.

32. A system for use in a freeze-drying procedure, the system comprising:

two or more vessels, each of the vessel comprising:

one or more container, each of the container having at least one wall defining an opening at one end; and a membrane, divided into membrane portions, each of the membrane portion being configured to cover the opening of a container, wherein each of the membrane portion is provided with an aperture which, in use, is aligned with the opening of the container and each of the membrane portion comprises a metal foil; and a support for receiving the two or more vessels and being configured to retain the two more vessels in alignment with one another, the support having at least one alignment feature configured to engage with a corresponding alignment feature of the membrane to thereby align the membrane relative to the two or more vessels.

33. A system according to claim 32, wherein the alignment feature of the support comprises one or more male member and the corresponding alignment feature of the membrane comprises one or more female member.

* * * * *